3,318,870
COPPER POLYETHYLENIMINE PRODUCTS
Fred N. Teumac, Lake Jackson, Tex., assignor to The Dow Chemical Company, Midland, Mich., a corporation of Delaware
No Drawing. Original application Nov. 5, 1962, Ser. No. 235,505, now Patent No. 3,234,127, dated Feb. 8, 1966. Divided and this application Jan. 15, 1965, Ser. No. 431,757
3 Claims. (Cl. 260—239)

This is a division of Ser. No. 235,505, filed Nov. 5, 1962, now U.S. Patent 3,234,127.

This invention relates to the control of aquatic growth by the treatment of bodies of water with copper ions. More specifically, the invention concerns an improved method for stabilizing copper ions at concentration levels sufficiently high to inhibit and destroy undesirable aquatic growth, especially in alkaline waters.

Copper ions have proved very effective in controlling aquatic growth when employed at concentrations above certain minimum values. These effective concentrations are generally easily established in bodies of water having a pH of 7 or less by merely adding suitable amounts of water-soluble copper salts. However, when lakes, streams, industrial and municipal water systems and other waters have an alkaline pH, such treatment is usually ineffective due to the precipitation of insoluble compounds of copper which prevents establishment of the required copper ion concentration. Efforts to circumvent this problem have led to the use of stabilizing or complexing agents which increase the solution concentration of copper ions. For example, see U.S. Patent 2,734,028. These prior art methods have, in general, been unsuccessful in stabilizing copper ions at concentrations sufficiently high, i.e. about 2 to 3 parts per million (hereafter p.p.m.), to permit effective control of undesirable vegetal aquatic life over the continuous alkaline pH range of 7.1 to about 10.3 which is frequently encountered in various water systems.

It is an object of the present invention to provide an improved method for stabilizing copper ions at solution concentrations which provide highly effective inhibition and destruction of undesirable vegetal aquatic life, especially in alkaline waters.

It is another object of this invention to provide a method for stabilizing copper ions which utilizes a stabilizing agent that is easily removed at a subsequent time.

A further object of the invention is to provide a stabilizing agent which supplements the inhibitory and destructive effect of copper ions on undesirable vegetal aquatic growth.

Another object of the invention is to provide a method which employs economically low concentrations of a stabilizing agent to accomplish the previously stated objectives.

Further objects and advantages of the present invention will become apparent from the following description and examples.

In the method of the present invention, resinous homopolymers and copolymers of ethylenimine are employed to stabilize copper ions at concentration levels which permit effective control of undesirable vegetal aquatic life, especially in large bodies of alkaline water. These ethylenimine polymers provide stable copper ion solutions, over the pH range of 7.1 to 10.3, having a copper concentration of from about 2 to 3 p.p.m. As a result of their flocculating activity, these polymers are easily removed from the water at a time subsequent to the treatment. These polymers also advantageously increase the inhibitory and destructive effect of copper ions on undesirable vegetal aquatic life. For example, the effectiveness of copper ions on Chlorella, a copper resistant algae, is increased approximately 20 percent by the polymer-stabilized copper ion solutions in alkaline waters as compared to the effectiveness of copper ions alone in a water system having a pH less than 7.

A copper ion treating solution, in accordance with the present invention, is easily and simply prepared by dissolving a water-soluble copper salt, e.g. copper sulfate, in an aqueous or bulk solution of the ethylenimine polymer at a copper:polymer weight ratio of from about 3:1 to 1:3 and adding this solution to the body of water to be treated in an amount sufficient to establish a copper concentration of from about 2 to 3 ppm. For example, 100 ml. of an aqueous solution containing $14.4 \times 10^4$ p.p.m. copper and $4.8 \times 10^4$ p.p.m. of polyethylenimine, prepared by standard solution and dilution techniques, will provide a copper ion concentration of 3 p.p.m. when added to 1267 gallons of water.

The polymers which are employed to stabilize copper ions, in accordance with the present invention, are selected from water-soluble homopolymers of ethylenimine and copolymers of ethylenimine composed of a major proportion of ethylenimine and a minor proportion of a monoethylenically unsaturated monomer of the group consisting of styrene and monoethylenically unsaturated monomers copolymerizable with styrene. The ethylenimine polymers employed in the method of the present invention may have molecular weights as low as 500 but a preferred weight is above 10,000 with an upper limit determined by the highest molecular weight of the polymer which is water-soluble. Conventional methods, known to the art, may be used to prepare polyethylenimine. See, for example, Jones et al., Journal of Organic Chemistry, vol. 9, pages 125–147 (1944).

The following methods describe the preparation of representative ethylenimine polymers employed in the present invention. These methods, however, are not to be interpreted as limiting the invention other than as defined in the claims.

*Method A*

A copolymer of ethylenimine and hexafluoropropene, suitable for use in the method of the present invention, was prepared by the following procedure.

A quantity of 84.8 g. (1.97 moles) of ethylenimine was placed in a flask equipped with a condenser. The flask was placed in a controlled temperature bath and 33 g. (0.32 mole) of hexafluoropropene was slowly added while the temperature of the flask contents was maintained at 55° C. A viscous liquid product was formed which was identified as a copolymer of ethylenimine and hexafluoropropene.

*Method B*

A copolymer of ethylenimine and tetrafluoroethylene, suitable for use in the method of the present invention, was prepared as follows.

A quantity of 10.7 g. (0.11 mole) of tetrafluoroethylene was slowly added to 117.6 g. (2.7 moles) of ethylenimine in accordance with the procedure of Example 2. The reaction product, an opaque liquid, was identified as a copolymer of ethylenimine and tetrafluoroethylene.

Copolymers of ethylenimine and other polyfluoroalkylenes, suitable as stabilizing agents for copper ions in the method of the present invention, may be prepared by methods similar to the above example by merely substituting the desired polyfluoroalkylene.

I claim:
1. An aqueous, polymer-stabilized copper ion solution comprising (1) from about 1 to 3 parts by weight of a water-soluble polymer selected from (a) polyethylenimine and (b) copolymers composed of a major proportion of ethylenimine and a minor proportion of a monethyl- enically unsaturated monomer of the group consisting of styrene and monoethylenically unsaturated monomers copolymerizable with styrene, and (2) from about 3 to 1 parts by weight of copper in the form of a water-soluble copper salt.

2. The aqueous polymer-stabilized copper ion solution of claim 1 wherein the water-soluble polymer is polyethylenimine having a molecular weight of at least about 500.

3. The aqueous polymer-stabilized copper ion solution of claim 1 wherein the water-soluble polymer is composed of a major proportion of ethylenimine and a minor proportion of a member selected from the group consisting of tetrafluoroethylene and hexafluroethylene.

References Cited by the Examiner
UNITED STATES PATENTS
2,897,162  7/1959  Lowe _____ 260—77.5

ALEX MAZEL, *Primary Examiner.*
ALTON D. ROLLINS, *Assistant Examiner.*